June 1, 1954   O. MUTH   2,679,777
PREDETERMINED TORQUE RELEASE WRENCH
Filed June 6, 1951   3 Sheets-Sheet 1
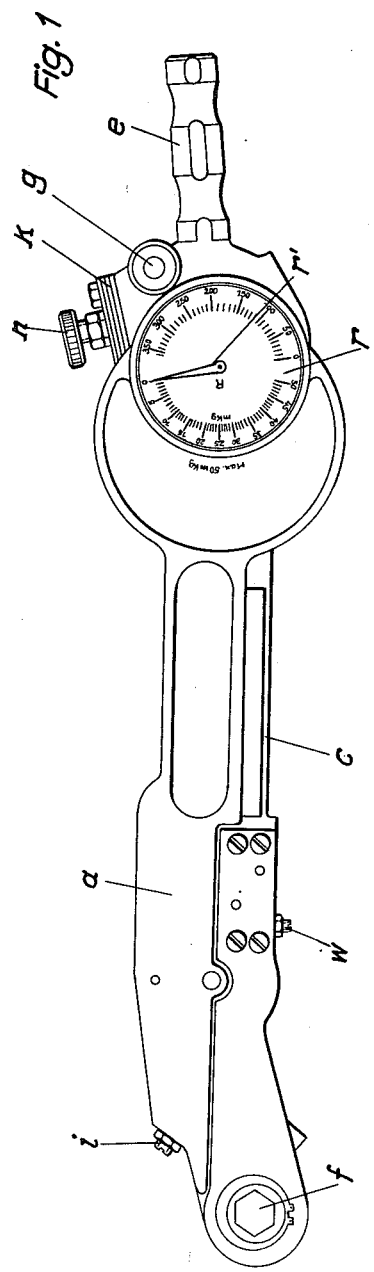
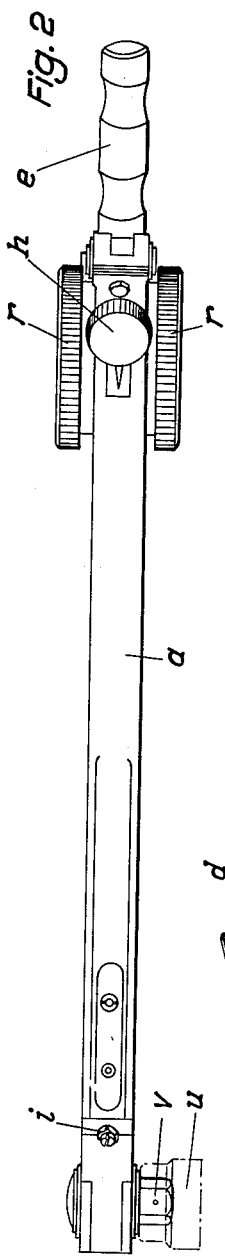
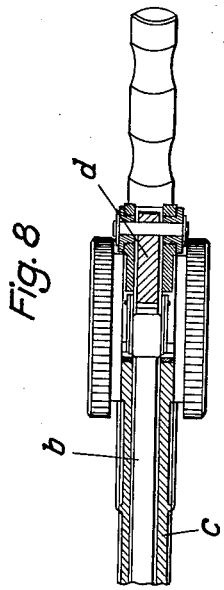
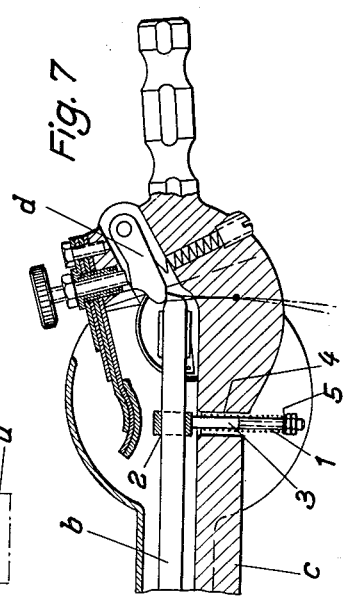
Inventor:
Otto Muth
by Dezsoe Steinberg
attorney June 1, 1954  O. MUTH  2,679,777
PREDETERMINED TORQUE RELEASE WRENCH
Filed June 6, 1951  3 Sheets-Sheet 2
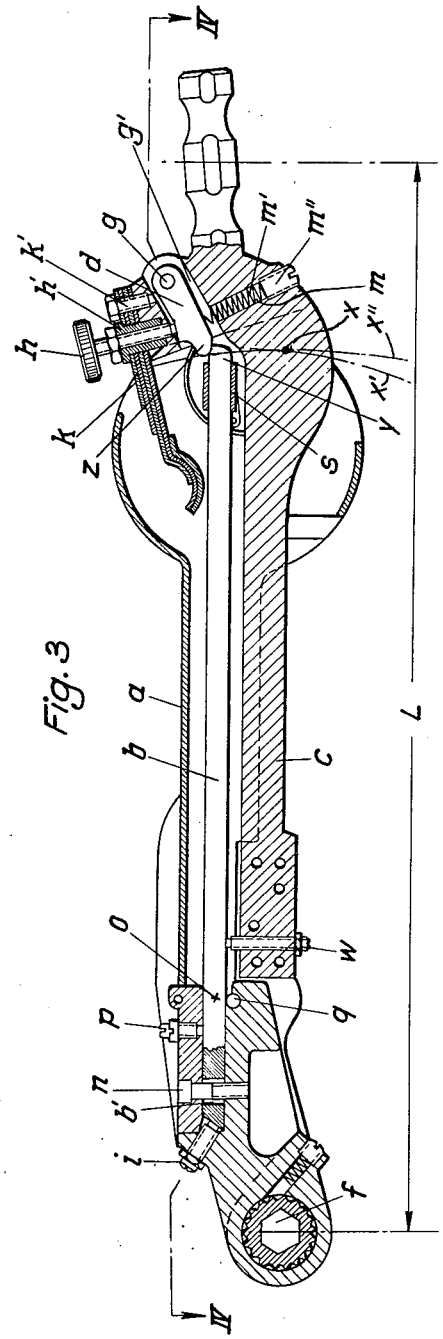
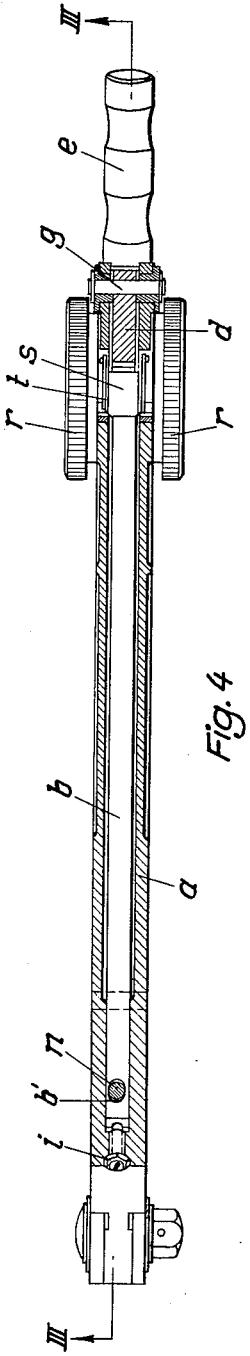
Inventor:
Otto Muth
by Dezsoe Steinberg
attorney June 1, 1954  O. MUTH  2,679,777
PREDETERMINED TORQUE RELEASE WRENCH
Filed June 6, 1951  3 Sheets-Sheet 3

Inventor:
Otto Muth
by Dezsoe Steinherz
attorney

Patented June 1, 1954

2,679,777

UNITED STATES PATENT OFFICE 2,679,777

PREDETERMINED TORQUE RELEASE WRENCH

Otto Muth, Solingen, Germany, assignor to Eduard Wille, Wuppertal-Cronenberg, Germany, a firm Application June 6, 1951, Serial No. 230,109

7 Claims. (Cl. 81—52.5)

Torque-measuring spanners known from the prior art, which are based on spring action, such as torsion-rod spring, resilient bar, or helical spring, have the disadvantage that every measurement must be taken by reading the indicated value, and this is rather tiresome for the operator.

For this reason, spanners have been suggested in which a light signal appears or a bell rings or an impellent sensation is caused to appear after the desired tightening moment has been reached in order to relieve the operator of the tiring observation of the dial gauge or measuring scale. However, such constructions still have the disadvantage that the operator may overdraw the desired tightening moment because the manual force is not interrupted suddenly when the signal appears.

Spanners having a sliding clutch have also been known, but they vary their values quickly as the friction changes and they require constant regauging within very short intervals.

These disadvantages are eliminated by the present invention, which is illustrated by way of example in the appended drawings in which Figure 1 is a front view of a torque-measuring spanner according to the invention;

Figure 2 is a side elevation of the spanner shown in Figure 1;

Figure 3 is a longitudinal section of the torque-measuring spanner shown in Figure 1;

Figure 4 is a longitudinal section of Figure 2;

Figures 7 and 8 are fragmentary illustrations of a somewhat modified embodiment according to Figures 3 and 4.

In Figures 1 and 3 $a$ represents the body of the spanner, while $b$ is a bending-rod spring mounted within the body of the spanner and rigidly connected thereto at one of its ends, by means of screws $n$ and $p$. Part $c$, $e$ of the torque-measuring spanner is hingedly connected to body $a$ of the spanner as at $f$.

Body $a$ of the spanner comprises an adjustment screw $i$, the end of which compressively engages the oblique end of resilient bar $b$, thus permitting movement of the latter longitudinally. This is attained by suitable location of the hole or slot $b'$, which receives the screw $n$. In order to render the screw readily accessible, the head $f$ of the spanner is kept small. Furthermore, the head is provided with a ratchet which eliminates resetting of the spanner when a screw is tightened. A box spanner socket $u$ (see Figure 2) can be placed on the right side as well as on the left side of the spanner by pushing the receiving dowel through the head of the spanner to extend on the desired side.

Part $c$ of the spanner is provided with a pin $g$ which pivotally bears a short lever or arm $d$. Adjustment screw $h$ provided at part $c$ of the spanner limits the position of the lever $d$ in one lateral direction within the slot $g'$. The tension of the spring $m$ which is provided within a bore $m'$ and contacts the lever $d$ can be adjusted by the screw $m''$. A leaf spring $k$ which consists of one or more leaves and does not contact, or only very softly contacts, the resilient bar $b$ in its position of rest (normal position), is fastened to member $c$ of the spanner by means of threaded bushing $h'$ and screw $k'$.

The length of resilient bar $b$ or the length of lever $d$ are dimensioned in such manner that their ends $y$ or $z$, respectively, somewhat overlap each other. At its free end the resilient bar $b$ is somewhat flattened so as to form a bearing surface $y'$ which may be contacted by a rounded projection $z'$ of lever $d$.

A clearance between bearing surface $y'$ and projection $z'$ can be obtained by means of a stop screw $w$ (Figure 3).

Figure 5:
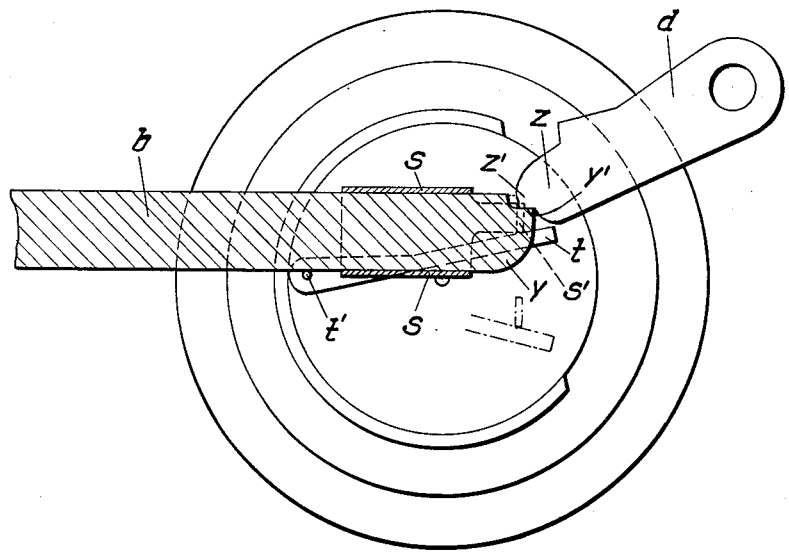
Figure 5 is an enlarged fragmentary view of Figure 3.
Figure 6:
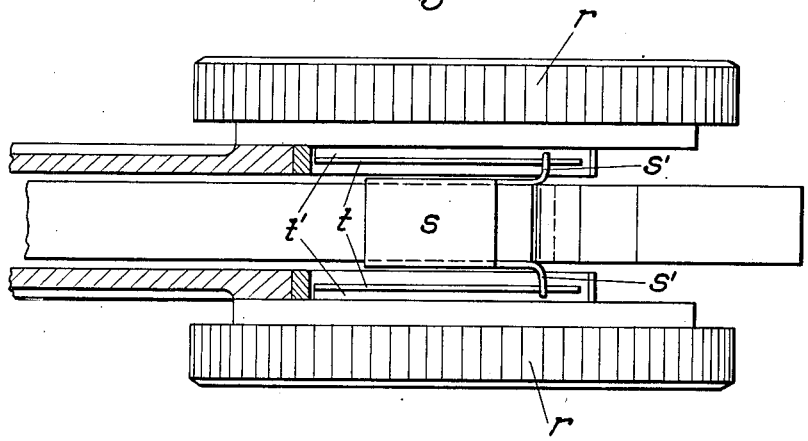
Figure 6 is an enlarged fragmentary view of Figure 4.

As shown in Fig. 6, a shoe $s$ which is slid into the end of the resilient bar $b$ and has been provided with laterally bent off portions $s'$, can be moved longitudinally along resilient bar $b$. Levers $t$ operate, when being rotated, the hands $r'$ of torque-dial gauges $r$, which are provided at both sides of the device.

In the embodiment shown in Figures 7 and 8, a sleeve 2 is placed on resilient bar $b$. A pin 3 is fastened to sleeve 2 and extends through spanner member $c$. Arranged around pin 3 is a pull-back spring 1 which is inserted in a bore 4 and countersunk into spanner member $c$. The tension of spring 1 can be adjusted by nuts 5. Spring 1 is adapted to cause retraction of spanner member $c$. When operating spanner member $c$, the pull-back spring 1 receives no further initial tension. Thereby, exactness of the indicated value is not affected. By this arrangement, retraction of the lever $c$ takes place automatically and more safely.

When using the spanner, box-spanner socket $u$ after being attached to receiving dowel $v$, is placed on a screw or nut, which has to be tightened. Handle $e$ which, if desired, can be extended by an extension pipe or extension bar or the like, is moved against the resistance of the screw or nut which has to be tightened. This causes deflection of the resilient bar $b$, the amount of deflection depending on the exerted power, and its end $y$ describes approximately an arc about point $o$. End $z$ or $z'$, respectively, of arm $d$ (connected with arm $c$) moves about another arc around the axis of spannerhead $f$. When the point of intersection $x$ of these two arcs is reached, projection $z'$ slips off its bearing surface $y'$, and this results in an interruption of the power transmission at this moment. The point of intersection $x$ of the two arcs $X'X''$ shown in Figure 3 represents the slipping or cut-out point for the spanner. Point $x$ can suitably be adjusted by screw $h$, by the action of which the spanner may be set to any desired cut-out value.

When cutting out, i. e. when end $x$ of bending-rod spring $b$ slips off the end $z$ of the lever $d$, resilient bar $b$ swings back, the repulsion being cushioned or intercepted by the leaf-spring $k$ or by means of other springs. Resilient bar $b$ is then, automatically by means of spring action or the like, brought back to its original position, whereby lever $d$ may yield against the spring $m$ and finally return by passing over the end of the resilient bar into its normal position so that the surfaces $y'$ and $z'$ contact each other.

It is preferred to arrange the dial-gauge $rr$ closely behind handle $e$, so that the dial-gauge can be conveniently read off. By circumferentially moving the dial, it may be set to zero as well as to higher initial values and may be gauged to meter-kilogram, or any other measuring system. The indicated value may be adjusted to the correct value by means of the adjustable shoe $s$. In the construction shown by way of example, two dial-gauges have been provided for use for right, as well as left, handed threads. The box-spanner socket $u$ (Fig. 2) is hereby attached to one or the other side of the spanner, to the receiving dowel $v$, which slidingly passes through the spanner head, and may extend to either side of the latter.

According to the invention, the operator of the spanner has to watch neither the indication nor a signal, as the spanner automatically cuts out at the preset torque-value, and this value can be kept as constant as possible, i. e. it should vary only within close limits. By adjusting screw $h$, all desired measuring values of the dial-gauge can be set. If a correction due to wear becomes necessary the zero point can be re-attained by readjustment of screws $i$ and $h$.

The spanner according to the invention can be operated also without the automatic cut-out, by simply reading off the tightening value.

What I claim is:

1. A predetermined torque release wrench comprising a first member having means for operatively engaging a workpiece and carrying a spring rod secured thereto at one end a predetermined distance from said means, and a second member provided with a handle and hinged to said first member around the axis of said means and further carrying, near the free end of the spring rod of the first member, coupling means adapted to engage the free end of said rod so that while the second member is moved by means of said handle, the first member, due to engagement of the spring rod with the coupling means, is moved therewith until owing to differences in the arcs described by the ends of the spring rod and the coupling means the spring rod is disengaged from said coupling means.

2. A predetermined torque release wrench comprising a first member having means for operatively engaging a workpiece, and a second member provided with a handle and hinged to said first member, the said first member bearing a spring rod positively secured to said first member so that its free end terminates near said handle, said second member being provided with means adapted to engage the free end of said spring rod so as to move both members together, and to release said end as soon as a predetermined torque has been reached, the distance from the free end of said spring rod to the point where it is secured to said first member being less than the distance from this end to the axis around which the second member is hinged to the first member.

3. A predetermined torque release wrench comprising a first member having means for operatively engaging a workpiece and bearing a spring rod secured to said member a predetermined distance from said means, and a second member having rod engaging means adapted to engage the free end of said rod and hinged to said first member near said work engaging means, so that after a predetermined movement of the two members the engaging means of the second member releases the free end of the rod of the first member, the hinge axis of the two members substantially coinciding with the center of the work engaging means of the first member.

4. A predetermined torque release wrench comprising a first member having means for operatively engaging a workpiece and bearing a spring rod secured to said member a predetermined distance from said means, and a second member having rod engaging means adapted to engage the free end of said rod and hinged to said first member near said work engaging means, so that after a predetermined movement of the two members the engaging means of the second member releases the free end of the rod of the first member, the engaging means of the second member consisting of a lever, the initial position of which is adjustable and which after the release of the free end of said rod by means of a spring is brought back into its initial position.

5. A predetermined torque release wrench comprising a first member having means for operatively engaging a workpiece, and a second member provided with a handle and hinged to said first member, the said first member bearing a spring rod positively secured to said member so that its free end terminates near said handle, said second member being provided with means adapted to engage the free end of said spring rod so as to move both members together, and to release said end as soon as a predetermined torque has been reached, a resilient connecting means between said spring rod and said second member being provided for causing the second member to follow the first member as soon as the free end of the spring rod is released.

6. A predetermined torque release wrench comprising a first member having means for operatively engaging a workpiece, and a second member provided with a handle and hinged to said first member, the said first member bearing a spring rod positively secured to said first member so that its free end terminates near said handle, said second member being provided with means adapted to engage the free end of said spring rod so as to move both members together, and to release said end as soon as a predetermined torque has been reached, a torque indicating device on the second member, the pointer of said device being moved by a lever which is operated by a portion of said spring rod located substantially at the free end of said rod.

7. A predetermined torque release wrench comprising a first member having means for operatively engaging a workpiece, and a second member provided with a handle and hinged to said first member, the said first member bearing a spring rod positively secured to said first member so that its free end terminates near said handle, said second member being provided with means adapted to engage the free end of said spring rod so as to move both members together, and to release said end as soon as a predetermined torque has been reached, the torque release wrench comprising two torque indicating devices on the second member, the pointers of which are each moved by a lever which is operated by a portion of said spring rod located substantially at the free end of said rod, one of said torque indicating devices being adapted to indicate the torque occurring when turning the wrench counterclockwise.

References Cited in the file of this patent

UNITED STATES PATENTS

| Number | Name | Date |
| --- | --- | --- |
| 2,122,760 | Scott et al. | July 5, 1938 |
| 2,159,354 | Dunn | May 23, 1939 |
| 2,174,356 | Zimmerman | Sept. 26, 1939 |
| 2,343,380 | Larson et al. | Mar. 7, 1944 |
| 2,400,205 | Livermont | May 14, 1946 |
| 2,448,095 | Hallett et al. | Aug. 31, 1948 |

FOREIGN PATENTS

| Number | Country | Date |
| --- | --- | --- |
| 399,901 | Great Britain | Oct. 19, 1933 |